(12) United States Patent
Chang et al.

(10) Patent No.: US 9,442,220 B2
(45) Date of Patent: Sep. 13, 2016

(54) COMPOSITION FOR POLARIZING FILM, POLARIZING FILM, METHOD OF MANUFACTURING THE SAME, AND LIQUID CRYSTAL DISPLAY PROVIDED WITH THE POLARIZING FILM

(75) Inventors: Won Suk Chang, Seongnam-si (KR); Myung Sup Jung, Seongnam-si (KR); Myung Man Kim, Suwon-si (KR); Jong Hoon Won, Yongin-si (KR); Won Cheol Jung, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 39 days.

(21) Appl. No.: 13/220,948

(22) Filed: Aug. 30, 2011

(65) Prior Publication Data
US 2012/0050652 A1  Mar. 1, 2012

(30) Foreign Application Priority Data

Aug. 30, 2010 (KR) .................. 10-2010-0084143
Jul. 18, 2011 (KR) .................. 10-2011-0071149

(51) Int. Cl.
*G02B 1/08* (2006.01)
*B29C 43/00* (2006.01)
(Continued)

(52) U.S. Cl.
CPC .............. *G02B 1/08* (2013.01); *B29C 43/003* (2013.01); *B29C 55/04* (2013.01); *B29D 11/00788* (2013.01); *C08J 5/18* (2013.01); *C08L 23/0815* (2013.01); *C08L 23/10* (2013.01); *G02B 5/3033* (2013.01); *B29C 43/021* (2013.01); *B29K 2023/10* (2013.01); *B29K 2023/12* (2013.01); *B29K 2023/16* (2013.01); *B29K 2105/0032* (2013.01); *B29K 2105/0088* (2013.01); *B29K 2995/0034* (2013.01); *B29K 2995/0051* (2013.01); *C08J 2323/08* (2013.01); *C08J 2323/10* (2013.01); *C08J 2423/08* (2013.01);
(Continued)

(58) Field of Classification Search
CPC .. C08L 23/0815; C08L 23/10; B29C 43/003; B29C 43/021; B29C 55/04; B29K 2023/10; B29K 2023/16; B29K 2995/0034; C08J 2323/08; C08J 2323/10; C08J 2423/08; C08J 2423/10; C08J 5/18; C08K 5/0041; G02B 1/08; G02B 5/3033
USPC ............ 428/1.3–1.31; 349/96, 122; 264/1.34
See application file for complete search history.

(56) References Cited

U.S. PATENT DOCUMENTS 3,200,173 A * 8/1965 Schilling ...................... 525/268
4,953,952 A * 9/1990 Okumura et al. ............ 349/106
(Continued)

FOREIGN PATENT DOCUMENTS

JP  1998-113404 A  5/1988
JP  2004-151264 A  5/2004
(Continued)

OTHER PUBLICATIONS
JPO Website Machine English Translation of JP 2009-217012, Nakasumi et al., Sep. 24, 2009.*
(Continued)

*Primary Examiner* — Sophie Hon
(74) *Attorney, Agent, or Firm* — Cantor Colburn LLP

(57) ABSTRACT

A composition for a polarization film including a polyolefin component including polypropylene and a polyethylene-polypropylene copolymer; and a dichroic dye.

16 Claims, 1 Drawing Sheet

(51) Int. Cl.
  *B29C 55/04* (2006.01)
  *C08L 23/08* (2006.01)
  *C08L 23/10* (2006.01)
  *G02B 5/30* (2006.01)
  *C08J 5/18* (2006.01)
  *B29D 11/00* (2006.01)
  *B29C 43/02* (2006.01)
  *B29K 23/00* (2006.01)
  *C08K 5/00* (2006.01)
  *B29K 105/00* (2006.01)

(52) U.S. Cl.
  CPC .......... *C08J 2423/10* (2013.01); *C08K 5/0041* (2013.01); *Y10T 428/1041* (2015.01)

(56) References Cited

U.S. PATENT DOCUMENTS

| | | | |
|---|---|---|---|
| 5,258,208 A | | 11/1993 | Bastiaansen |
| 5,310,509 A | | 5/1994 | Okada et al. |
| 5,968,688 A | | 10/1999 | Masuda et al. |
| 6,300,415 B1 * | | 10/2001 | Okayama et al. ............ 525/191 |
| 2002/0193515 A1 * | 12/2002 | Ohta et al. ...................... 525/30 |
| 2003/0215582 A1 * | 11/2003 | Bermel .................. B29C 41/12 428/1.31 |
| 2004/0135117 A1 * | 7/2004 | Liu et al. .................... 252/299.1 |
| 2005/0249963 A1 * | 11/2005 | Obata et al. .................. 428/523 |
| 2006/0183860 A1 * | 8/2006 | Mehta et al. ................. 525/191 |
| 2007/0079740 A1 * | 4/2007 | Sadamitsu et al. ............. 112/12 |
| 2007/0210480 A1 * | 9/2007 | Funaki et al. ............. 264/176.1 |
| 2009/0134535 A1 * | 5/2009 | Gerlach et al. ............. 264/1.34 |
| 2010/0222517 A1 * | 9/2010 | Hino et al. .................... 525/240 |
| 2012/0052197 A1 * | 3/2012 | Sawada et al. ............. 427/163.1 |

FOREIGN PATENT DOCUMENTS

| | | | | |
|---|---|---|---|---|
| JP | 2007023091 A | * | 2/2007 | |
| JP | 2009-217012 A | | 9/2009 | |
| KR | 1019930000576 A | | 1/1993 | |
| WO | WO 2010126078 A1 | * | 11/2010 | ............... G02B 5/30 |

OTHER PUBLICATIONS

452157 Aldrich, Polypropylene, Sigma-Aldrich, 20013.*
Abstract of WO/2009/038142, Hino et al., Mar. 26, 2009.*

* cited by examiner

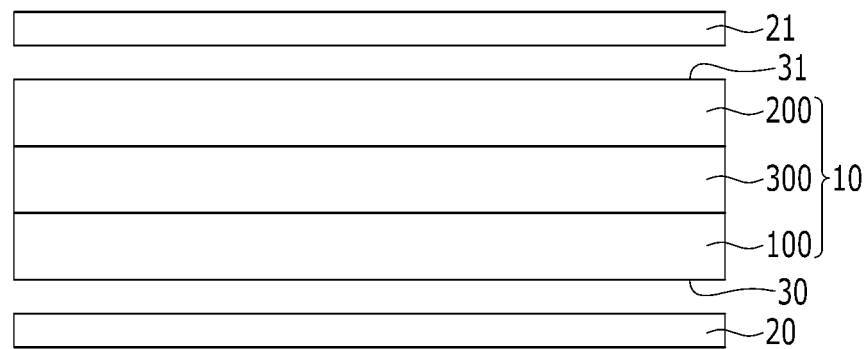

COMPOSITION FOR POLARIZING FILM, POLARIZING FILM, METHOD OF MANUFACTURING THE SAME, AND LIQUID CRYSTAL DISPLAY PROVIDED WITH THE POLARIZING FILM

CROSS-REFERENCE TO RELATED APPLICATION

This application claims priority to Korean Patent Application No. 10-2010-0084143, filed on Aug. 30, 2010, and Korean Patent Application No. 10-2011-0071149, filed on Jul. 18, 2011, and all the benefits accruing therefrom under 35 U.S.C. §119, the contents of which in their entirety are incorporated herein by reference.

BACKGROUND

1. Field

A composition for a polarization film, a polarization film, a method of manufacturing the same, and a liquid crystal display ("LCD") including the polarization is film are provided.

2. Description of the Related Art

A liquid crystal display ("LCD") is a type of flat panel display that is currently being widely used. The LCD includes two display panels, each provided with an electric field generating electrode, and a liquid crystal layer interposed therebetween, wherein liquid crystal molecules are rotated depending upon an electric field formed between the electric field generating electrodes to thereby vary light transmittance and display an image. The LCD includes a polarizing plate on an outer surface of the display panels. The polarizing plate transmits polarized light, and thus controls a polarization direction of incident light on the display panel and light emitted from the display panel. The polarizing plate generally includes a polarizer and a protective layer for the polarizer. The polarizer may be formed of, for example, polyvinyl alcohol ("PVA"), and the protective layer may be formed of, for example, triacetyl cellulose ("TAC"). However, manufacture of the polarizing plate including the polarizer and the protective layer not only involves a complicated process and high production costs, but also results in a thick polarizing plate, which leads to an increased thickness of a display device.

SUMMARY

An embodiment provides a composition for a polarization film that may simplify a process and decrease production cost, and that may be used for providing a thinner display device.

Another embodiment provides a polarization film that is uniaxially elongated and includes the composition for a polarization film.

Yet another embodiment provides a method for fabricating the polarization film.

Still another embodiment provides a liquid crystal display ("LCD") provided with the polarization film.

According to an embodiment, a composition for a polarization film is provided that includes a polyolefin component including polypropylene and a polyethylene-polypropylene copolymer; and a dichroic dye.

According to another embodiment, a uniaxially elongated polarization film is provided that includes a polyolefin component including polypropylene and a polyethylene-polypropylene copolymer, and a dichroic dye.

According to yet another embodiment, a method for forming a polarization film includes: melting a composition for a polarization film, the composition including a polyolefin component including polypropylene and a polyethylene-polypropylene copolymer, and a dichroic dye; disposing the molten mixture into a mold; compressing the molten mixture to form a sheet; and uniaxially elongating the sheet to form the polarization film.

According to still another embodiment, an LCD is provided that includes a first display panel and a second display panel opposite the first display panel, a liquid crystal layer between the first display panel and the second display panel, and a polarization film disposed on an outer surface of at least one of the first display panel and the second display panel, wherein the polarization film includes a polyolefin component including polypropylene and a polyethylene-polypropylene copolymer, and a dichroic dye, and is uniaxially elongated.

The polypropylene may have a melt flow index ("MFI") of about 0.1 gram per 10 minutes (g/10 min) to about 5 g/10 min.

The polyethylene-polypropylene copolymer may include about 1 weight percent (wt %) to about 50 wt % of an ethylene group, based on a total weight of the copolymer.

The polyethylene-polypropylene copolymer may have a melt flow index ("MFI") of about 5 g/10 min to about 15 g/10 min.

The polyolefin component may contain the polypropylene and the polyethylene-polypropylene copolymer in a weight ratio of about 1:9 to about 9:1.

The polyolefin component may have a melt flow index ("MFI") of about 1 g/10 min to about 15 g/10 min.

The polyolefin component may have a haze of about 5% or less and a crystallinity of about 50% or less.

The dichroic dye may have a dichroic ratio ranging from about 1.5 to about 14.

The dichroic dye may have an absorbance of about 0.38 or less for light of all wavelengths ranging from about 380 nanometers (nm) to about 780 nm.

The dichroic dye may be included in an amount of about 0.05 to about 2 parts by weight, based on about 100 parts by weight of the polyolefin component.

A difference between a solubility parameter of the polyolefin component and a solubility parameter of the dichroic dye may be about 10 or less.

The polarization film may have a total light transmittance of about 20% or greater in a wavelength range of about 380 nm to about 780 nm. In an embodiment the wavelength range may correspond to that of visible light.

The polarization film may have polarizing efficiency of about 85% or greater in a wavelength range about 380 nm to about 780 nm. In an embodiment the wavelength range may correspond to that of visible light.

The polarization film may have a thickness of about 25 micrometers (μm) to about 150 μm.

According to the above method, the sheet may be uniaxially elongated at an elongation ratio of about 300% to about 1000%.

BRIEF DESCRIPTION OF THE DRAWING

The above and other aspects, advantages and features of this disclosure will become more apparent by describing in further detail exemplary embodiments thereof with reference to the accompanying drawings, in which:

FIG. 1 is a cross-sectional view of an embodiment of a liquid crystal display ("LCD").

DETAILED DESCRIPTION

This disclosure will be described more fully hereinafter with reference to the accompanying drawings, in which exemplary embodiments of the present invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another is element, there are no intervening elements present. As used herein, the term "and/or" includes any and all combinations of one or more of the associated listed items.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different is orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and is their shapes are not intended to illustrate the precise shape of a region and are not intended to limit the scope of the present claims.

A composition for a polarization film and a polarization film comprising a product (e.g., a film) of the composition are disclosed.

In an embodiment, the composition for a polarization film comprises: a polyolefin component comprising polypropylene and a polyethylene-polypropylene copolymer; and a dichroic dye.

In another embodiment, a polarization film is uniaxially elongated and includes the composition for a polarization film.

The polypropylene and the polyethylene-polypropylene copolymer may be simply blended to form the polyolefin component.

The polyolefin component has excellent water resistance and may be hydrophobic.

The polypropylene has excellent mechanical strength, and the polyethylene of the polyethylene-polypropylene copolymer has excellent haze characteristics.

While not wanting to be bound by theory, it is believed that improved properties are provided by use of the particular combination of polymers described herein. For example, use of the polyethylene-polypropylene copolymer in the polyolefin component may substantially or effectively prevent the polypropylene from crystallizing and may provide improved haze characteristics and excellent mechanical strength. Also, use of the polyethylene-polypropylene copolymer in the polyolefin component may substantially or effectively prevent the polyethylene units from phase separating by including the polyethylene units in a copolymer with the polypropylene.

The polypropylene may have a melt flow index ("MFI") of about 0.1 gram per 10 minutes (g/10 min) to about 5 g/10 min, specifically about 0.5 g/10 min to about 3 g/10 min, more specifically about 1 g/10 min to about 2 g/10 min. Herein, the melt flow index ("MFI") denotes the amount of a molten polymer flowing every 10 minutes, and it is related to the viscosity of the molten polymer. In other words, as the melt flow index ("MFI") becomes smaller, the viscosity of the polymer becomes higher, and as the melt flow index ("MFI") becomes larger, the viscosity of the polymer becomes lower. When the melt flow index ("MFI") of the polypropylene is in the range of about 0.1 g/10 min to about 5 g/10 min, specifically about 0.5 g/10 min to about 3 g/10 min, more specifically about 1 g/10 min to about 2 g/10 min, workability of the composition may be effectively improved and the properties of the final product may be effectively improved. Particularly, in an embodiment the polypropylene may have a melt flow index ("MFI") of about 0.5 g/10 min to about 5 g/10 min.

The polyethylene-polypropylene copolymer may include an ethylene group in an amount of about 1 weight percent (wt %) to about 50 wt %, specifically about 2 wt % to about 40 wt %, more specifically about 4 wt % to about 30 wt %, based on the total weight of the copolymer. When the amount of the ethylene group in the polyethylene-polypropylene copolymer is in the foregoing range, the phase separation between the polypropylene and the polyethylene-polypropylene copolymer may be substantially or effectively prevented. Also, polarization characteristics of a product (e.g., a film) of the composition may be improved by having an increased elongation ratio during elongation and excellent light transmittance and orientation. The polyethylene-polypropylene copolymer may include an ethylene group in an amount of about 1 weight percent (wt %) is to about 25 wt %, specifically 2 wt % to about 20 wt %, more specifically 4 wt % to about 15 wt %, based on the total weight of the copolymer.

The polyethylene-polypropylene copolymer may have a melt flow index ("MFI") of about 1 g/10 min to about 20 g/10 min, specifically about 5 g/10 min to about 15 g/10 min, more specifically about 7 g/10 min to about 13 g/10 min. When the melt flow index ("MFI") of the polyethylene-polypropylene copolymer is in the foregoing range, workability may be effectively improved and the properties of a product of the composition may be effectively improved. Particularly, in an embodiment the polyethylene-polypropylene copolymer may have a melt flow index ("MFI") of about 10 g/10 min to about 15 g/10 min.

The polypropylene, the polyethylene-polypropylene copolymer, or both may further comprise one or more other comonomers to adjust or otherwise provide the desired characteristics of the polarization film, provided that such comonomers do not significantly adversely affect the desired properties of the polarization films. The one or more comonomers are copolymerizable, and generally have 2 to 20, specifically 3 to 10, more specifically 4 to 8 carbon atoms, and can be an alpha-olefin, for example 1-butene, isobutene, 1-pentene, 1-hexene, 1-octene, branched isomers thereof, styrene, α-methylstyrene, methyl vinyl ether, and the like; a diolefin, for example 3-butadiene, isoprene, 2,3-dimethyl-1,3-butadiene, 2-ethyl-1,3-butadiene, piperylene, myrcene, allene, 1,2-butadiene, 1,4,9-decatrienes, 1,4-hexadiene, 1,6-octadiene, 1,5-hexadiene, 4-methyl-1,4-hexadiene, 5-methyl-1,4-hexadiene, 7-methyl-1,6-octadiene, phenylbutadiene, pentadiene norbornadiene, alkyl derivatives thereof, 5-alkylidene-2-norbornene compounds, 5-alkenyl-2-norbornene compounds, such as 5-methylene-2-norbornene, 5-ethylidene-2-norbornene, 5-propenyl-2-norbornene, 1,4-cyclohexadiene, 1,5-cyclooctadiene, 1,5-cyclododecadiene, methyltetrahydroindene, dicyclopentadiene, bicyclo [2.2.1]hepta-2,5-diene, or the like; compounds with internal olefin bonds, for example 2-butene, 2-pentene, or the like; or halogenated (including perhalogenated), specifically chlorinated and/or fluorinated (including perchlorinated and/or perfluorinated) alpha-olefins or diolefins, for example tetrafluoroethylene chlorotrifluoroethylene, vinyl fluoride, hexafluoropropylene, perfluoro(methyl vinyl ether), and the like. The amounts of the one or more comonomer in the polypropylene and/or the polyethylene-polypropylene copolymer can be, for example, about 0.1 wt % to about 25 wt %, specifically about 1 wt % to about 20 wt %, more specifically about 2 wt % to about 10 wt %, based on the total weight of the polymer, i.e., the polypropylene and/or the polyethylene-polypropylene copolymer. In an embodiment, no comonomers are present in either of the polypropylene and the polyethylene-polypropylene copolymer.

The polyolefin component may include the polypropylene and the polyethylene-polypropylene copolymer in a weight ratio of about 1:9 to about 9:1, specifically about 1:7 to about 7:1, more specifically about 1:5 to about 5:1. When the amount of the polypropylene and the polyethylene-polypropylene copolymer are in the foregoing range, haze characteristics of a product of the composition may be effectively improved by substantially or effectively preventing the polypropylene from crystallizing while having excellent mechanical strength. According to another embodiment, the polyolefin component may contain the polypropylene and the polyethylene-polypropylene copolymer in a weight ratio of about 4:6 to about 6:4, specifically about 4.5:5.5 to about 5.5:4.5. According to yet another embodiment, the polyolefin component may contain is the polypropylene and the polyethylene-polypropylene copolymer in a weight ratio of about 5:5.

The polyolefin component may have a melt flow index ("MFI") of about 1 g/10 min to about 15 g/10 min, specifically about 2 g/10 min to about 13 g/10 min, more specifically about 4 g/10 min to about 10 g/10 min. When the melt flow index ("MFI") of the polyolefin component is in the foregoing range, a degree of crystallization of the component may be suitable. Thus, excellent light transmittance provided and a viscosity appropriate for fabrication of a film may be obtained, thus providing improved workability. According to an embodiment, the polyolefin component may have a melt flow index ("MFI") ranging from about 5 g/10 min to about 15 g/10 min.

The polyolefin component may have haze of about 5 percent (%) or less, specifically a haze of 0.001% to about 5%, more specifically a haze of 0.01% to 4%. When the haze of the polyolefin component is in the foregoing range, the transmittance is of a product of the composition is improved, and thus a film product of the composition may have excellent optical properties. According to an embodiment, the polyolefin component may have haze of about 2% or less, specifically about 0.1% to about 2%, more specifically about 0.2% to about 1.5%. According to another embodiment, the polyolefin component may have haze of about 0.5% to about 2%.

The polyolefin component may have crystallinity of about 50% or less, specifically about 0.1% to about 50%, more specifically about 1% to about 25%. When the crystallinity of the polyolefin component is in the foregoing range, the haze may be decreased the composition may be used to provide a product having excellent optical properties. According to an embodiment, the polyolefin component may have is crystallinity of about 30% to about 50%. According to another embodiment, the polyolefin component may have crystallinity of about 45% or less.

The olefin component may further comprise one or more other polyolefins or modified polyolefins to adjust or otherwise provide the desired characteristics of the polarization film, provided that such other polyolefins do not significantly adversely affect the desired properties of the polarization films. In particular the other polyolefins are selected so as to not phase separate from the polypropylene and the polyethylene-polypropylene copolymer, which may increase haze. Examples of other polyolefins are poly(1-butene), poly(2-butene), poly(1-pentene), poly(2-pentene), poly(3-methyl-1-pentene), poly(4-methyl-1-pentene), ethylene-propylene-butylene copolymers, .polychlorotrifluoroethylene, polytetrafluoroethylene, and the like. Combinations comprising one or more of the foregoing other polyolefins or modified polyolefins can be used. Example of modified polyolefins are alkyl polyethers such as polymethylvinyl ether, perfluoroalkyl polyethers such as polyperfluoromethyl vinyl ether, ethylene vinyl acetate, chlorotrifluoroethylene, and the like. Such polyolefins and modified polyolefins, if present are used in small amounts, for example about 0.1 wt % to about 10 wt %, specifically about 0.5 wt % to about 5 wt %, based on the total weight of the polypropylene and polyethylene propylene copolymer.

The dichroic dye is a material that transmits light having different polarizations (i.e., polarization states) different amounts, and thus transmits light having a first orthogonal polarization component of a selected wavelength a different amount than light having a second orthogonal polarization component in the selected wavelength.

The dichroic dye may be dispersed in the polyolefin component and may be is elongated in a first axial direction to be arrayed in a first direction.

The dichroic dye may include, for example, a dye having a molecular backbone such as an azo compound, an anthraquinone compound, a phthalocyanine compound, an azomethine compound, an indigoid compound, thioindigoid compound, a merocyanine compound, a 1,3-bis (dicyanomethylene)indan compound, an azulene compound, a quinophthalonic compound, a triphenodioxazine compound, an indolo[2,3,b]quinoxaline compound, an imidazo [1,2-b]-1,2,4 triazine) compound, a tetrazine compound, a benzo compound, a naphthoquinone compound, or a combination thereof.

The dichroic dye may have a dichroic ratio ranging from about 1.5 to about 14, specifically about 2 to about 12, more specifically about 4 to about 10. Herein, the dichroic ratio is a value obtained by dividing a polarization absorption in a direction parallel to the polymer by a polarization absorption in a direction perpendicular to the polymer. The dichroic ratio may indicate the extent to which the dichroic dye is arrayed in a direction parallel to one direction.

In an embodiment, the dichroic dye may have a dichroic ratio of about 1.5 to about 14. When the dichroic ratio is in the foregoing range, the dichroic dye may have sufficient compatibility with the polyolefin. According to another embodiment, the dichroic ratio of the dichroic dye may range from about 1.5 to about 10.

When the dichroic ratio is within the foregoing range, melt kneading a combination of the dichroic dye and the polymer may induce the orientation of the polymer chain. Therefore, the orientation of the dye may also be induced, and polarization characteristics may be improved.

The dichroic dye may have an absorbance (e.g., an average absorbance) of about 0.38 or lower for the light of all wavelengths ranging from about 380 nanometers (nm) to about 780 nm. According to another embodiment, the dichroic dye may have an absorbance of about 0.1 to about 0.37, specifically about 0.21 to about 0.32, or about 0.31 to about 0.37, for the light of all wavelengths ranging from about 380 nm to about 780 nm. When the absorbance of the dichroic dye is in the foregoing range, excellent color reproducibility may be obtained.

The dichroic dye may be included in an amount of about 0.05 part by weight to about 2 parts by weight, specifically about 0.1 part by weight to about 1.5 part by weight, more specifically about 0.15 part by weight to about 1 part by weight, based 100 parts by weight of the polyolefin component. When the amount of the dichroic dye is in the foregoing range, sufficient polarization characteristics may be obtained. According to another embodiment, the dichroic dye may be included in an amount of about 0.05 part by weight to about 1.5 part by weight, based on about 100 parts by weight of the polyolefin component. According to yet another embodiment, the dichroic dye may be included in an amount of about 0.05 parts by weight to about 1 part by weight, based on about 100 parts by weight of the polyolefin component.

A difference between a solubility parameter of the polyolefin component and a solubility parameter of the dichroic dye may be about 10 or less, specifically about 0.1 to about 10, more specifically about 1 to about 5. When the difference is in the foregoing range, the polyolefin and the dichroic dye may have excellent compatibility and/or fusibility. According to another embodiment, the difference between the solubility parameter of the polyolefin component and the solubility parameter of the dichroic dye is may be about 5 or less.

The polarization film may have total light transmittance of about 20% or greater, specifically about 20% to about 99%, more specifically about 30% to about 90%, in the wavelength range of visible light, e.g., about 380 nm to about 780 nm. When the light transmittance of the polarization film is in the foregoing range, a suitably clear image may be provided. According to another embodiment, the polarization film may have total light transmittance of about 30% or greater for light of a wavelength ranging from about 380 nm to about 780 nm. According to yet another embodiment, the polarization film may have total light transmittance of about 30% to about 50% for light of a wavelength ranging from about 380 nm to about 780 nm.

The polarization film may have a polarizing efficiency ("PE") of about 85% or greater, specifically about 85% to about 99%, more specifically about 87% to about 97%, in the wavelength range of visible light, e.g. light having a wavelength ranging from about 380 nm to about 780 nm. When the polarizing efficiency of the polarization film is in the foregoing range, a suitably clear image may be provided. According to another embodiment, the polarization film may have polarizing efficiency of about 90% to about 99% for light of a wavelength ranging from about 380 nm to about 780 nm.

Because the polarization film has sufficient light transmittance and polarizing efficiency, the polarization film may be efficiently applied to a device, such as a liquid crystal display ("LCD").

The polarization film may have a thickness ranging from about 25 micrometers (μm) to about 150 μm.

Hereafter, a method for fabricating the polarization film is further disclosed.

The method for fabricating the polarization film includes: combining the polyolefin component and the dichroic dye, for example by mixing and melting the composition for a polarization film, which comprises a polyolefin component including polypropylene and a polyethylene-polypropylene copolymer, with a dichroic dye; forming a sheet from the combined polyolefin component and the dichroic dye, for example by disposing the molten mixture in a mold; compressing the molten mixture to form a sheet; and uniaxially elongating the sheet to form the polarization film. Other methods can be used, for example, for example dissolution of the polyolefin component in a solvent, and mixing with the dichroic dye, followed by casting, and removal of the solvent; or melt-mixing in an extruder followed by extrusion of the polyolefin component and the dichroic dye to form a sheet.

Hereafter, the composition for the polarization film, polypropylene, the polyethylene-polypropylene copolymer, the polyolefin component, the dichroic dye, and the polarization film are as disclosed above, unless stated otherwise.

In the melting of the polyolefin component and the dichroic dye, the dichroic dye may be included in an amount of about 0.05 part by weight to about 2 parts by weight, specifically about 0.1 part by weight to about 1.5 part by weight, more specifically about 0.15 part by weight to about 1 part by weight, based on about 100 parts by weight of the polyolefin component.

In the disposing of the molten mixture and the compressing of the molten mixture to form a sheet, the sheet may be formed by extrusion, for example by compressing the molten mixture in the mold with a high-pressure compressor at a relatively high temperature of about 200° C. to about 230° C., or by extruding the molten is mixture to a chill roll through a T-die, but is not limited thereto.

The process of the uniaxially elongating the sheet may be performed at about 100° C. to about 230° C., specifically about 110° C. to about 150° C., more specifically about 120° C. to about 140° C.

Also, the sheet may be uniaxially elongated at an elongation ratio of about 300% to about 1000%, specifically about 400% to about 900%, more specifically about 500% to about 800%. According to another embodiment, the sheet may be uniaxially elongated at an elongation ratio of about 400% to about 1000%. Herein, the elongation ratio denotes a ratio of the length of the sheet before the elongation to a length of the sheet after the elongation, and indicates an extent to which the sheet is elongated after the uniaxial elongation.

Hereinafter, a liquid crystal display ("LCD") according to an embodiment is disclosed in further detail referring to FIG. 1.

FIG. 1 is a cross-sectional view showing an embodiment of an LCD.

Referring to FIG. 1, the LCD according comprises a liquid crystal display panel 10 interposed between a first polarization film 20 and a second polarization film 21.

The liquid crystal display panel 10 may be a twist nematic ("TN") mode panel, a patterned vertical alignment ("PVA") mode panel, or the like.

The liquid crystal display panel 10 includes a first display panel 100, a second display panel 200, and a liquid crystal layer 300 interposed between the first display panel 100 and the second display panel 200.

The first display panel 100 may include, for example, a thin film transistor (not shown) disposed (e.g., formed) on a substrate (not shown) and a first electric field is generating electrode (not shown) connected thereto. The second display panel 200 may include, for example, a color filter (not shown) disposed (e.g., formed) on the substrate and a second electric field generating electrode (not shown).

The liquid crystal layer 300 may include a plurality of liquid crystal molecules. The liquid crystal molecules may have positive or negative dielectric anisotropy. When the liquid crystal molecules have positive dielectric anisotropy, a long axis thereof may be aligned substantially parallel to a surface (e.g., a major surface) of the first display panel 100 and the second display panel 200 when not applying an electric field, and may be aligned substantially perpendicular to the surface of the first display panel 100 and the second display panel 200 when an electric field is applied (e.g., present or on). On the contrary, when the liquid crystal molecules have negative anisotropy, a long axis thereof may be aligned substantially perpendicular to the surface of the first display panel 100 and the second display panel 200 when not applying an electric field, and may be aligned substantially parallel to the surface of the first display panel 100 and the second display panel 200 when an electric field is applied (e.g., present or on).

At least one of the first and second polarization films 20 and 21 are disposed on outer surfaces of the liquid crystal display panel 10. Although the polarization films are shown to be disposed on a lower surface 30 and on an upper surface 31 of the liquid crystal display panel 10 in FIG. 1, respectively, the opposite configuration may also be used, and thus second and the first polarization film may be disposed (e.g., formed) on the upper surface and the lower surface of liquid crystal display panel 10, respectively.

As further disclosed above, at least one of the first and second polarization films 20 and 21 is a uniaxially elongated film that comprises a product of a polyolefin is component, which comprises polypropylene and a polyethylene-polypropylene copolymer, and a dichroic dye. In an embodiment, at least one of the first and second polarization films 20 and 21 is a single layer without a protective layer. Thus in an embodiment, the LCD comprises on at least one outer surface of the LCD panel the polarization film, wherein the polarization film has a first surface adjacent to the LCD panel and an opposite second surface, wherein another layer (e.g., a protective layer) is not present on the second (e.g., outer) surface of the polarization film.

Hereafter, polypropylene, a polyethylene-polypropylene copolymer, a polyolefin component, a dichroic dye, and a polarization film are the same as disclosed above, unless stated otherwise.

While not wanting to be bound by theory, it is understood that because the polyolefin component has hydrophobic properties, it has excellent mechanical strength as well as sufficient water resistance. Thus, a protective layer may be omitted when using a product of the polyolefin component. Therefore, a protective layer, which may for example comprise triacetylcellulose ("TAC"), which may be undesirably costly, and which may be undesirably thick, may be omitted. Thus the disclosed polarization film may provide a desirably thin total thickness and may also decrease the production cost.

The above disclosure provides the polarization film applied to a liquid crystal display ("LCD"), but the concept of this disclosure is not limited thereto and the polarization film may be similarly applied to other display device which use a polarization film, such as an organic light emitting device, for example.

EXAMPLES

Hereinafter, the present disclosure is illustrated in more detail with reference to examples. The examples are exemplary embodiments, and the present disclosure shall not be limited thereto.

Example 1

Preparation of Composition for a Polarization Film and Manufacture of a Polarization Film A composition for a polarization film is prepared by mixing about 100 parts by weight of a polyolefin component containing a polypropylene resin (HU300, Samsung Total Petrochemicals Co., Ltd.) and a polyethylene-polypropylene copolymer resin (polyethylene ratio: 10 wt %, RJ565, Samsung Total Petrochemicals Co., Ltd.) in a weight ratio of about 5:5, and about 0.5 parts by weight of CIBA-BLACK dichroic dye. Subsequently, the composition for a polarization film is made molten at a temperature of about 230° C. Subsequently, a film is formed by putting the molten mixture into a sheet-type mold and compressing the mold with a roller. Subsequently, the film is uniaxially elongated at about 115° C. to form the polarization film. The formed polarization film has a thickness of about 50 μm.

Example 2

Preparation of Composition for a Polarization Film, and Manufacture of a Polarization Film A composition for a polarization film and a polarization film are prepared and formed according to the same method as Example 1, except that about 0.25 parts by weight of CIBA-BLACK dichroic dye is used. The formed polarization film has a thickness of about 50 μm.

Example 3

Preparation of Composition for a Polarization Film, and Manufacture of a Polarization Film A composition for a polarization film and a polarization film are prepared and formed according to the same method as Example 1, except that a polyolefin component containing a polypropylene resin (HU300, Samsung Total Petrochemicals Co., Ltd.) and a polyethylene-polypropylene copolymer resin (polyethylene ratio: 10 wt %, RJ565, Samsung Total Petrochemicals Co., Ltd.) in a weight ratio of about 4:6 is used. The formed polarization film has a thickness of about 50 μm.

Example 4

Preparation of Composition for a Polarization Film, and Manufacture of a Polarization Film A composition for a polarization film and a polarization film are prepared and formed according to the same method as Example 1, except that a polyolefin component containing a polypropylene resin (HU300, Samsung Total Petrochemicals Co., Ltd.) and a polyethylene-polypropylene copolymer resin (polyethylene ratio: 10 wt %, RJ565, Samsung Total Petrochemicals Co., Ltd.) in a weight ratio of about 6:4 is used. The formed polarization film has a thickness of about 50 μm.

Comparative Example 1

Preparation of Composition for a Polarization Film, and Manufacture of a Polarization Film A composition for a polarization film is prepared by mixing about 100 parts by weight of a polypropylene resin (HU300, Samsung Total Petrochemicals Co., Ltd.) and about 0.5 parts by weight of CIBA-BLACK dichroic dye. Subsequently, the composition for a polarization film is made molten at a temperature of about 230° C. Subsequently, a film is formed by putting the molten mixture into a sheet-type mold and compressing the mold with a roller. Subsequently, the film is uniaxially elongated at about 115° C. to form the polarization film. The formed polarization film has a thickness of about 50 μm.

Comparative Example 2

Preparation of Composition for a Polarization Film, and Manufacture of a Polarization Film A composition for a polarization film and a polarization film are prepared and formed according to the same method as Comparative Example 1, except that about 0.25 parts by weight of CIBA-BLACK dichroic dye based on about 100 parts by weight of a polypropylene resin (HU300, Samsung Total Petrochemicals Co., Ltd.) is used. The formed polarization film has a thickness of about 50 μm.

Comparative Example 3

Preparation of Composition for a Polarization Film, and Manufacture of a Polarization Film A composition for a polarization film and a polarization film are prepared and formed according to the same method as Comparative Example 1, except that a polyethylene-polypropylene copolymer resin (polyethylene ratio: 10 wt %, RJ565, Samsung Total Petrochemicals Co., Ltd.) is used instead of a polypropylene resin and about 0.5 parts by weight of CIBA-BLACK dichroic dye, based on about 100 parts by weight of a polyethylene-polypropylene copolymer resin, is used.

Comparative Example 4

Preparation of composition for a polarization film, and Manufacture of a Polarization Film A composition for a polarization film and a polarization film are prepared and formed according to the same method as Comparative Example 1, except that a polyethylene-polypropylene copolymer resin (polyethylene ratio: 10 wt %, RJ565, Samsung Total Petrochemicals Co., Ltd.) is used instead of a polypropylene resin and about 0.25 parts by weight of CIBA-BLACK dichroic dye, based on about 100 parts by weight of the polyethylene-polypropylene copolymer resin, is used.

Experimental Example 1

Measurement of Haze

Haze values of the polyolefin component without dye used in Examples 1 to 4 and Comparative Examples 1 to 4 are obtained using a spectrophotometer (KONICA MINOLTA, CM-3600d) to measure the turbidity of each sample. The measurement results are shown in the following Table 1 when the elongation ratio is about 1000%.

Experimental Example 2

Crystallinity

Crystallinity of the polyolefin component used in Examples 1 to 4 and Comparative Examples 1 to 4 are measured by dynamic scanning calorimetry (Perkin-Elmer, 8500). Herein, the crystallinity is defined as a value obtained by dividing an integral value of a heat emission peak that occurs upon heating and cooling of a film sample acquired from the elongation by an integral value of a heat emission peak when the crystallinity is about 100%. Herein, the results are shown in the following Table 1 when the elongation ratio is about 1000%.

TABLE 1

| Material | Haze (%) | Crystallinity (%) |
|---|---|---|
| Example 1 (elongation ratio: 1000%) | 1.58 | 42.5 |
| Example 3 (elongation ratio: 1000%) | 1.70 | 41.0 |
| Example 4 (elongation ratio: 1000%) | 1.72 | 44.0 |
| Comparative Example 1 (elongation ratio: 1000%) | 9.80 | 58.0 |
| Comparative Example 3 (elongation ratio: 1000%) | 5.40 | 55.0 |

As shown in Table 1, the haze and crystallinity characteristics of the resins used in Examples 1 to 4 are excellent compared to the haze and crystallinity characteristics of the resins used in Comparative Examples 1 to 4.

Experimental Example 3

Dichroic Ratio and Polarizing Efficiency

The light transmittance in the wavelength range of visible light, e.g., about 380 nm to about 780 nm, based on the elongation ratios of the polarization films fabricated according to Examples 1 to 4 and Comparative Examples 1 to 4, which are the light transmittances of the polarization films for the light entering in parallel to the transmissive axis of the polarization films, and the light transmittances of the polarization films for the light entering perpendicular to the transmissive axis of the polarization films, are measured using a UV-VIS spectrophotometer (JASCO, V-7100).

A dichroic ratio ("DR") and a polarizing efficiency ("PE") are obtained based on the measured light transmittances.

The dichroic ratio is obtained based on the following Equation 1.

$$DR = Abs_{\parallel} / Abs_{\perp} \quad \text{Equation 1}$$

In Equation 1,

DR denotes a dichroic ratio, $Abs_{\parallel}$ denotes optical absorbance of a polarization film with respect to light entering in parallel to a transmissive axis of a polarization film, and $Abs_{\perp}$ denotes optical absorbance of a polarization film with respect to light entering perpendicular to a transmissive axis of a polarization film.

The polarizing efficiency is obtained based on the following Equation 2.

$$PE(\%) = [(T_{\parallel} - T_{\perp})/(T_{\parallel} + T_{\perp})]^{1/2} \times 100 \quad \text{Equation 2}$$

In Equation 2,

PE denotes polarizing efficiency, $T_{\parallel}$ denotes light transmittance of a polarization film with respect to light entering in parallel to a transmissive axis of a polarization film, and $T_{\perp}$ denotes light transmittance of a polarization film with respect to light entering perpendicular to a transmissive axis of a polarization film.

The results are shown in the following Table 2.

TABLE 2

| | Elongation ratio (%) | | |
|---|---|---|---|
| | 300 | 600 | 1000 |
| Example 1 | | | |
| $T_{\parallel}$ (%) | 1.54 | 1.67 | 3.44 |
| $T_{\perp}$ (%) | 0.0072 | 0.0082 | 0.012 |
| dichroic ratio | 3.32 | 3.35 | 3.51 |
| polarizing efficiency (%) | 99.53 | 99.51 | 99.65 |
| transmittance (%) | 29.95 | 33.20 | 36.73 |
| Example 3 | | | |
| $T_{\parallel}$ (%) | 16.48 | 17.056 | 15.368 |
| $T_{\perp}$ (%) | 1.3 | 1.175 | 0.325 |
| dichroic ratio | 2.41 | 2.43 | 2.82 |
| polarizing efficiency (%) | 92.40 | 93.33 | 97.91 |
| transmittance (%) | 28.01 | 29.82 | 30.19 |
| Example 4 | | | |
| $T_{\parallel}$ (%) | 22.66 | 23.452 | 21.131 |
| $T_{\perp}$ (%) | 0.884 | 0.799 | 0.221 |
| dichroic ratio | 2.82 | 2.85 | 3.30 |
| polarizing efficiency (%) | 96.17 | 96.65 | 98.96 |
| transmittance (%) | 29.31 | 30.82 | 32.67 |
| Comparative Example 1 | | | |
| $T_{\parallel}$ (%) | 16.9 | 21.34 | 25.7 |
| $T_{\perp}$ (%) | 1.04 | 0.71 | 1.28 |
| dichroic ratio | 2.56 | 3.2 | 3.21 |
| polarizing efficiency (%) | 94.02 | 96.73 | 95.14 |
| transmittance (%) | 24.10 | 25.66 | 28.21 |
| Comparative Example 3 | | | |
| $T_{\parallel}$ (%) | 20.59 | 29.47 | 32.27 |
| $T_{\perp}$ (%) | 1.152 | 0.923 | 0.864 |
| dichroic ratio | 2.56 | 3.2 | 3.21 |
| polarizing efficiency (%) | 94.55 | 96.92 | 97.36 |
| transmittance (%) | 26.58 | 27.93 | 30.69 |
| Example 2 | | | |
| $T_{\parallel}$ (%) | 22.66 | 23.45 | 21.13 |
| $T_{\perp}$ (%) | 0.68 | 0.61 | 0.17 |
| dichroic ratio | 2.12 | 2.21 | 2.62 |
| polarizing efficiency (%) | 97.06 | 97.43 | 99.20 |
| transmittance (%) | 25.16 | 29.69 | 32.63 |
| Comparative Example 2 | | | |
| $T_{\parallel}$ (%) | 22.53 | 20.7 | 16.84 |
| $T_{\perp}$ (%) | 1.73 | 1.68 | 1.22 |
| dichroic ratio | 3.3 | 3.21 | 3.43 |
| polarizing efficiency (%) | 92.59 | 92.19 | 93.00 |
| transmittance (%) | 22.95 | 23.20 | 26.73 |
| Comparative Example 4 | | | |
| $T_{\parallel}$ (%) | 23.66 | 21.74 | 17.68 |
| $T_{\perp}$ (%) | 1.095 | 0.96 | 0.33 |
| dichroic ratio | 3.3 | 3.21 | 3.43 |
| polarizing efficiency (%) | 95.47 | 95.68 | 98.15 |
| transmittance (%) | 24.82 | 24.44 | 28.71 |

It may be seen from the results shown in Table 2 that the polarizing efficiency and transmittance of the polarization films prepared according to Examples 1, 3, and 4 are superior to or at least as high as the polarizing efficiency and transmittance of the polarization films prepared according to Comparative Examples 1 and 3. Also, the polarizing efficiency and transmittance of the polarization film prepared according to Example 2 are superior to the polarizing efficiency and transmittance of the polarization films prepared according to Comparative Examples 2 and 4.

While not wanting to be bound by theory, it is understood that the films of the examples provide these properties because the haze and crystallinity characteristics of the polyolefin component used in Examples 1 to 4 are excellent compared to the haze and crystallinity characteristics of the polyolefin component used in Comparative Examples 1 to 4.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A film product of a composition for a polarization film, the composition comprising:
   a polyolefin component comprising a blend of a polypropylene and a polyethylene-polypropylene copolymer, wherein the polyolefin component contains the polypropylene and the polyethylene-polypropylene copolymer in a weight ratio of about 4.5:5.5 to about 1:5, the polyethylene-polypropylene copolymer comprises an ethylene group in an amount of about 1 wt % to about 50 wt %, there is no other comonomer present in the polypropylene and the polyethylene-polypropylene copolymer, and other polyolefins are present in a total amount of less than or equal to about 10 wt % based on the total weight of the polypropylene and the polyethylene-polypropylene copolymer: and
   a dichroic dye, wherein the dichroic dye has an absorbance of about 0.31 to 0.37 for light of all wavelengths ranging from about 380 nanometers to about 780 nanometers, and wherein an amount of the dichroic dye in the composition is about 0.05 parts by weight to about 2 parts by weight based on 100 parts by weight of the polyolefin component,
   wherein a crystallinity value of the polyolefin component, obtained by dividing an integral value of a heat emission peak that occurs upon heating and cooling of a film sample acquired from an about 300% to about 1000% elongation by an integral value of a heat emission peak when the crystallinity is about 100%, is about 50% or less,
   wherein a difference between a solubility parameter of the polyolefin component and a solubility parameter of the dichroic dye is about 0.1 to about 10, and
   wherein the polyolefin component in the film product has a haze value of less than 2%, and the polarization film has a combination of a total light transmittance of greater than 30% and a polarization efficiency of greater than 97% in the wavelength range of visible light when the sheet elongation ratio is about 1,000%.

2. The film product of a composition for a polarization film of claim 1, wherein the polypropylene has a melt flow index of about 0.1 gram per 10 minutes to about 5 grams per 10 minutes.

3. The film product of a composition for a polarization film of claim 1, wherein the polyethylene-polypropylene copolymer comprises about 4 weight percent to about 15 weight percent of an ethylene group, based on a total weight of the copolymer.

4. The film product of a composition for a polarization film of claim 1, wherein the polyethylene-polypropylene copolymer has a melt flow index of about 5 grams per 10 minutes to about 15 grams per 10 minutes.

5. The film product of a composition for a polarization film of claim 1, wherein the polyolefin component has a melt flow index of about 1 gram per 10 minutes to about 15 grams per 10 minutes.

6. The film product of a composition for a polarization film of claim 1, wherein the dichroic dye has a dichroic ratio ranging from about 1.5 to about 14.

7. The film product of a composition for a polarization film of claim 1, wherein a difference between a solubility parameter of the polyolefin component and a solubility parameter of the dichroic dye is about 0.1 to about 5.

8. A polarization film comprising the film product according to claim 1, wherein the film product is uniaxially elongated.

9. The polarization film of claim 8, wherein the polarization film has a total light transmittance of about 30 percent or greater and a polarizing efficiency of about 85 percent or greater in a wavelength range of about 380 nanometers to about 780 nanometers.

10. The polarization film of claim 8, wherein the polarization film has a thickness of about 25 micrometers to about 150 micrometers.

11. A display device comprising:
    a first display panel and a second display panel opposite the first display panel;
    a liquid crystal layer between the first display panel and the second display panel; and
    a polarization film disposed on an outer surface of at least one of the first display panel and the second display panel,
    wherein the polarization film is the polarization film according to claim 8.

12. The film product of a composition for a polarization film of claim 1, wherein the polyolefin component contains the polypropylene and the polyethylene-polyporpylene copolymer in a weight ratio of about 4.5:5.5 to about 4:6.

13. The film product of a composition for a polarization film of claim 1, wherein the composition consists of the polyolefin component and the dichroic dye.

14. The film product of a composition for a polarization film of claim 1, wherein the dichroic dye is included in an amount of about 0.15 to about 1 part by weight, based on 100 parts by weight of the polyolefin component.

15. A method for forming a polarization film, the method comprising:
    melting a composition for a polarization film, the composition comprising
    a polyolefin component comprising a blend of a polypropylene and a polyethylene-polypropylene copolymer, wherein the polyolefin component contains the polypropylene and the polyethylene-polypropylene copolymer in a weight ratio of about 4.5:5.5 to about 1:5, the polyethylene-polypropylene copolymer comprises an ethylene group in an amount of about 1 wt % to about 50 wt %, there is no other comonomer present in the polypropylene and the polyethylene-polypropylene copolymer, and other polyolefins are present in a total amount of less than or equal to about 10 wt % based on the total weight of the polypropylene and the polyethylene-polypropylene copolymer, and
    a dichroic dye;
    disposing the molten mixture in a mold;
    compressing the molten mixture to form a sheet; and
    uniaxially elongating the sheet to form the polarization film,
    wherein the dichroic dye has an absobance of about 0.31 to 0.37 for light of all wavelengths ranging from about 380 nanometers to about 780 nanometers, wherein an amount of the dichroic dye in the composition is about 0.05 parts by weight to about 2 parts by weight based on 100 parts by weight of the polyolefin component, wherein a crystallinity value of the polyolefin component, obtained by dividing an integral value of a heat emission peak that occurs upon heating and cooling of a film sample acquired from an about 300% to about 1000% elongation by an integral value of a heat emission peak when the crystallinity is about 100%, is about 50% or less, wherein a difference between a solubility parameter of the polyolefin component and a solubility parameter of the dichroic dye is about 0.1 about 10, and wherein the polyolefin component in the film product has a haze value of less than 2%, and the polarization film has a combination of a total light transmittance of greater than 30% and a polarization efficiency of greater than 97% in the wavelength range of visible light when the sheet elongation ratio is about 1,000%.

16. The method of claim 15, wherein the sheet is uniaxially elongated at an elongation ratio of about 300 percent to about 1000 percent.

\* \* \* \* \*